UNITED STATES PATENT OFFICE.

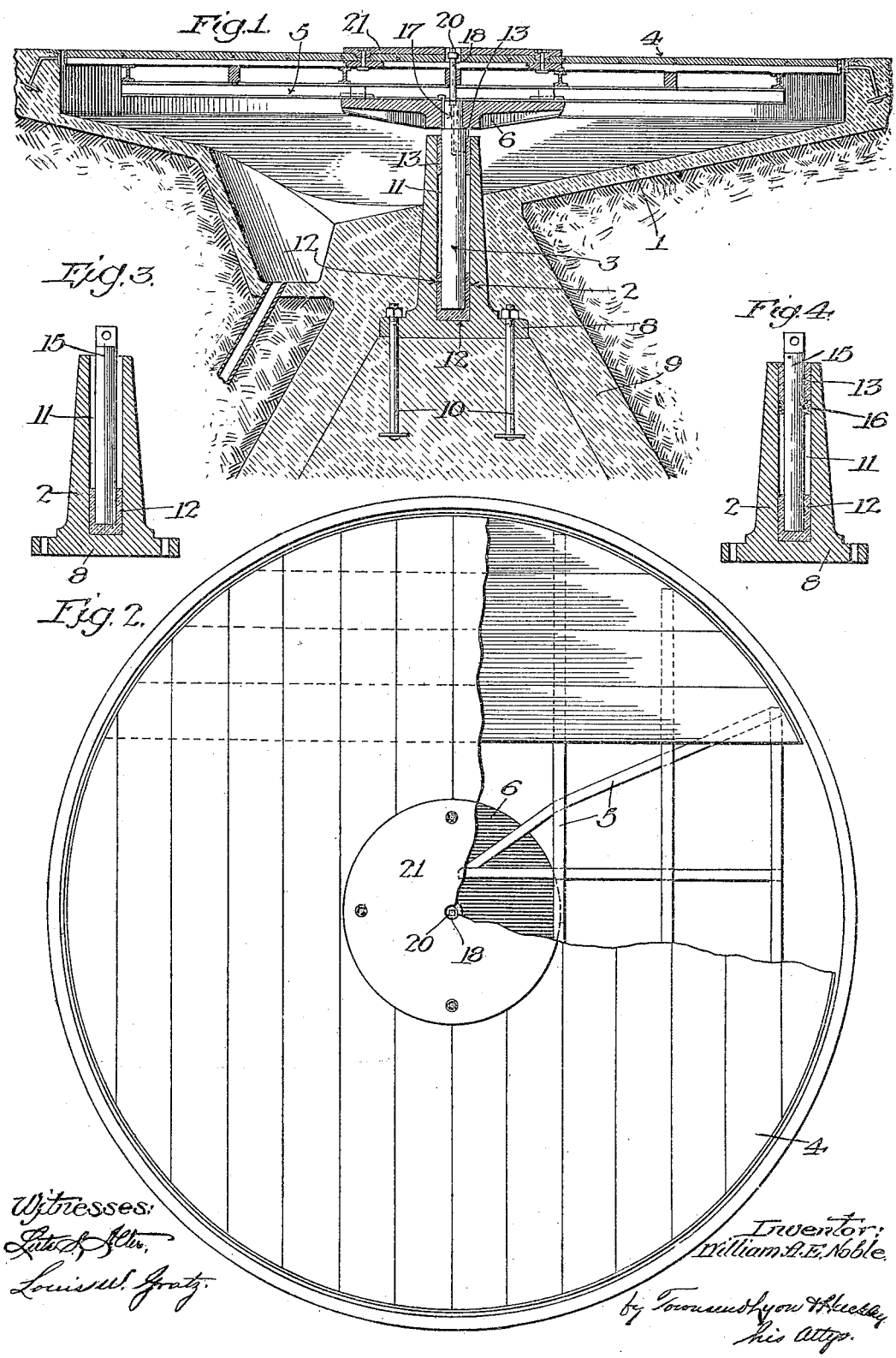

WILLIAM A. E. NOBLE, OF HOLLYWOOD, CALIFORNIA, ASSIGNOR TO UNITED CASTING COMPANY, OF LOS ANGELES, CALIFORNIA, A CORPORATION OF CALIFORNIA.

AUTOMOBILE TURN-TABLE BEARING AND METHOD OF MAKING THE SAME.

958,162.  Specification of Letters Patent.  Patented May 17, 1910.

Application filed January 25, 1910. Serial No. 540,071.

*To all whom it may concern:*

Be it known that I, WILLIAM A. E. NOBLE, a citizen of the United States, residing at Hollywood, in the county of Los Angeles and State of California, have invented a new and useful Automobile Turn-Table Bearing and Method of Making the Same, of which the following is a specification.

This invention relates to a bearing for an automobile turn-table and the main object of the invention is to provide a bearing which will support a turn-table firmly against lateral tilting or deflection and with a minimum of friction.

In the accompanying drawings:—Figure 1 is a vertical section of the turn-table and its support. Fig. 2 is a plan of the turn-table, partly broken away. Figs. 3 and 4 are vertical sections of the bearing in different stages of construction thereof.

1 designates the pit for the turn-table, 2 the pier or standard, 3 the pivot or supporting post mounted to turn in said pier, and 4 the table carried by said post. Said table may be of any suitable or usual construction, consisting, for example, of a platform carried by a frame 5 supported by a head 6 which is mounted rigidly on the post 3.

The pier 2 consists of a vertical tubular standard having a base 8 embedded in a concrete foundation 9 and tied thereto by bolts 10, the chamber or recess 11 within said standard being of sufficient dimensions to receive the bearings for the pivot post 3 of the table. Said bearings comprise a lower step bearing 12 at the bottom of said chamber or recess in the pier and an annular bearing 13 at the upper end of said recess. Both of said bearings are preferably of babbitt and are formed *in situ*, as follows: A mandrel, indicated at 15 in Fig. 3, is placed centrally within the recess 11 of the standard 2 and supported with its lower end somewhat above the bottom of said recess and babbitt is then poured into the intervening space to the required height to give a step bearing of sufficient depth. A stopper of clay or luting, or other plastic material, indicated at 16 in Fig. 4, is then forced into the space between the mandrel and the standard in the form of a ring, tightly fitting said space, said ring being pushed down to leave a space above the same and between the mandrel and standard corresponding to the required dimensions for the upper bearing 13. Melted babbitt is then poured into this space to fill the same and after cooling thereof the mandrel is withdrawn, leaving the upper and lower bearings free for the reception of the pivot post 3, said mandrel being of proper dimensions to give a snug but not tight fit for the pivot post, thereby providing a bearing for the post which will prevent friction and lateral tipping and at the same time allow free rotation.

The pivot bearings are preferably oiled by means of an oil duct 17 extending downwardly from the top of the pivot post and then laterally to the outside of the post, so as to lead the oil to the upper bearing whence it flows down the post to the lower bearing. A pipe 18 screwing into the upper end of the pivot post 3 communicates with the oil duct 17 and is closed at its upper end by a screw plug 20. A protecting shield plate 21 is provided on the table 4 surrounding the plug 20 to prevent injury thereto by the wheels of an automobile.

What I claim is:—

1. In an automobile turn-table, the combination with the pivot post of the turn-table, of a bearing comprising a standard having a vertical recess, a babbitt bearing at the lower end of said recess formed with a cylindrical recess to receive the lower end of the pivot post and form a step bearing therefor, and an annular babbitt bearing at the upper end of said recess surrounding the pivot post.

2. In an automobile turn-table, the combination with a vertical standard having a vertical recess, a pivot post extending within said recess and separated therefrom at the bottom and all sides, babbitt at the lower end of the pivot post occupying the space between the lower end of the pivot post and the bottom and sides of the recess, and babbitt at the upper end of the recess occupying the space between the pivot post and the walls of the recess.

3. In an automobile turn-table, the combination with a vertical standard having a vertical recess, a pivot post extending within said recess and separated therefrom at the bottom and all sides, babbitt at the lower end of the pivot post occupying the space between the lower end of the pivot post and the bottom and sides of the recess, and babbitt at the upper end of the recess occupying the space between the pivot post and the walls of the recess, said post having an oil duct extending from its upper end to the side of the post, and means for closing said oil duct at the top.

4. In an automobile turn-table, the combination with the pivot post of the turn table, of a bearing comprising a standard having a vertical recess, a bearing at the lower end of said recess formed with a cylindrical recess to receive the lower end of the pivot post and form a step bearing therefor, and an annular bearing at the upper end of said recess surrounding the pivot post.

5. The method of making a pivot bearing for automobile turn-tables which consists in supporting in a vertical recess a mandrel corresponding in dimensions to the pivot post, said mandrel being supported in such manner as to leave a space between the bottom of the mandrel and the recess and between the walls of the mandrel and the walls of the recess at all sides thereof, pouring melted babbitt into the lower portion of such space to form a babbitt bearing below and around the lower end of the mandrel, then forming an annular stopper of plastic material in the space between the mandrel and the standard at a distance below the top of the standard, pouring melted babbitt into the space above said stopper and below the top of the standard to form a babbitt bearing surrounding the upper portion of the mandrel, and then withdrawing the mandrel.

In testimony whereof, I have hereunto set my hand at Los Angeles California this 12th day of January 1910.

WILLIAM A. E. NOBLE.

In presence of—
ARTHUR P. KNIGHT,
FRANK L. A. GRAHAM.